Jan. 23, 1940. P. B. BLOCKER 2,187,724
PISTON AND RING ASSEMBLY
Original Filed Nov. 30, 1936
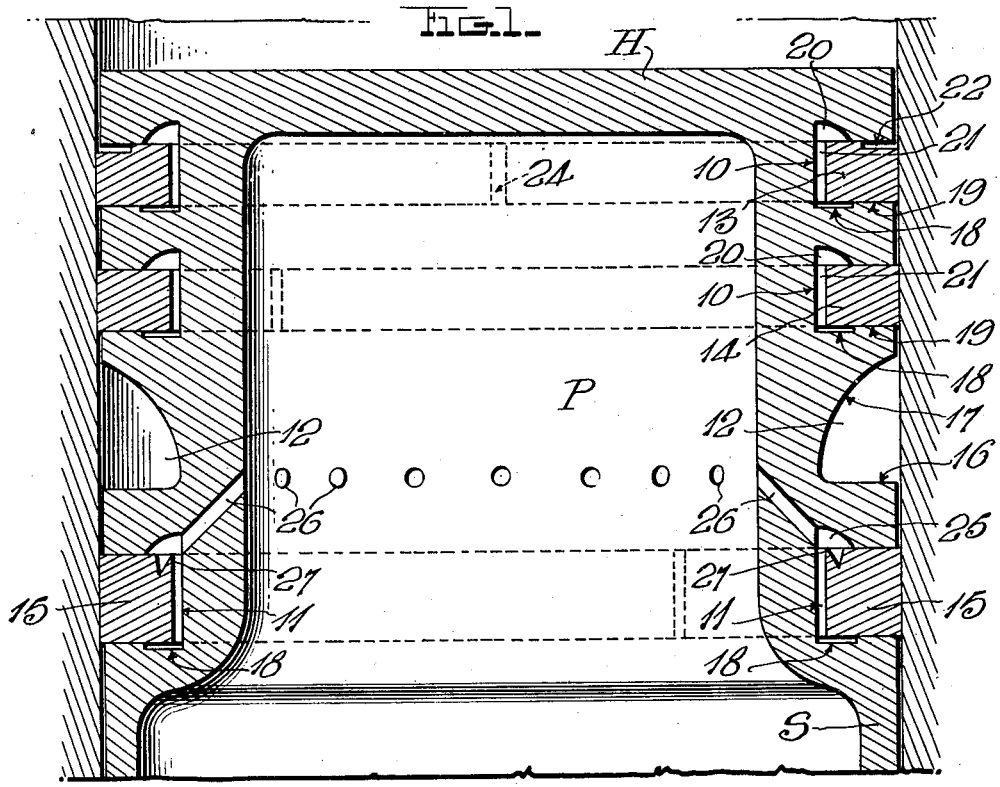
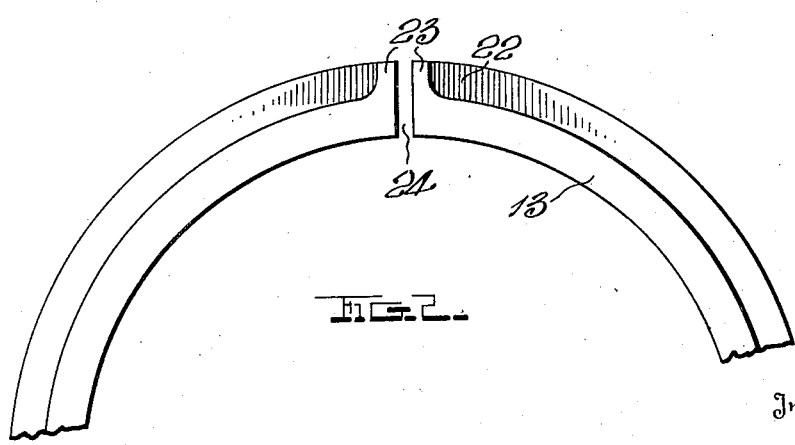
Inventor
Preston B. Blocker
WITNESS
H. Woodard
By H. B. Willson & Co.
Attorneys Patented Jan. 23, 1940

2,187,724

UNITED STATES PATENT OFFICE 2,187,724

PISTON AND RING ASSEMBLY

Preston Brooks Blocker, Silver City, N. Mex., assignor of twenty-five per cent to Herman Howie Uhli and twenty-five per cent to John Henry Shettler, both of Silver City, N. Mex.

Application November 30, 1936, Serial No. 113,456
Renewed March 28, 1939

13 Claims. (Cl. 309—7)

The invention aims to provide a new and improved piston and ring assembly for internal combustion engines and compressors, which will give perfect oil control and regulation and prevent so-called "oil pumping" with its accompanying ills.

With the foregoing in view, the invention resides in the novel subject matter hereinafter described and claimed, description being accomplished by reference to the accompanying drawing.

Fig. 1 is a vertical sectional view through the upper portion of a piston and ring assembly according to the invention.

Fig. 2 is a fragmentary top view of the upper compression ring.

A piston P is shown having a head H and skirt S, said skirt being provided with preferably two compression ring grooves 10 near its head, with an oil ring groove 11 spaced downwardly from said compression ring grooves, and with a gas pressure groove 12 between said grooves 10 and 11. Upper and lower compression rings 13 and 14 are provided in the grooves 10 and are preferably of the construction herein disclosed, although other compression rings allowing very little "blow-by" may be used. Similarly, while the oil ring 15 is preferably of the structure herein disclosed excellent results may be obtained with the conventional type of step-cut compression ring. Ventilated rings and scraper rings are not only unnecessary but are objectionable in this assembly. However, I consider that the best results are attainable when using the specific compression ring disclosed, with the specific oil ring disclosed. The groove 12 which is preferably somewhat wider, vertically, than the grooves 10 and 11, receives what gases manage to blow by the compression rings 13 and 14. The pressures above are so much greater than the suction below, that a substantially constant pressure of gases is maintained in the groove 12, as long as the engine or compressor is in operation, thereby preventing oil ascending to the cylinder above the piston, under the influence of the partial vacuum created upon the suction strokes of said piston. Also, the groove 12 allows for expansion of the "blow-by" gases and the consequent reduction of pressure eliminates to a considerable extent, the leak of these gases past the oil ring 15 into the crank case, and such gases as may condense in the groove 12 are worked upwardly and kept from the crank case by the differential of kinetic energy. In this connection, it is well to remember that any crank-connected piston travels more rapidly during the upper half of crank pin swing, than during the lower half of such swing, due to the fact that the angle between connecting rod and line of piston travel gradually widens while the crank pin is moving from top dead center to a position exactly horizontal from the crank shaft center whereas said angle gradually narrows as the piston pin moves from the last mentioned position to bottom dead center. The more rapid travel of the piston in the head end of the cylinder necessarily means that said piston be brought to a more abrupt stop at upper dead center, than at lower dead center, with the result that the piston tends to upwardly throw any oil thereon into the cylinder, and the piston will similarly act upon any gases which may condense in the groove or trap 12. This groove is preferably provided with a flat horizontal bottom wall 16 and with a transversely concave outwardly inclined wall 17 which inclines upwardly and outwardly from said wall 16 to the piston periphery. This outwardly inclined wall 17 allows any liquid in the groove 12, such as condensed gases or raw fuel from priming, to be readily thrown upwardly and outwardly from said groove when the piston suddenly stops at upper dead center and starts on its downward stroke, thereby preventing such liquids from reaching the crank case with the well-known disadvantages.

Each of the grooves 10 and 11 is provided, in the present showing, with a vertically shallow, horizontally wide channel 18 formed in its inner lower corner, leaving a flat horizontal land 19 at the lower side of the groove, between said channel 18 and the periphery of the piston. Each of the grooves 10 is also preferably provided in its upper inner corner, with another vertically shallow, horizontally wide channel 20. The channel 20 is of greater cross sectional area than the channel 18 to retard the upward progress of the oil. The channels 18 and 20 and the clearances 21 between the inner edges of the rings 13, 14 and 15 and the piston, trap oil and therefore assure a constant supply of oil to these rings, greatly facilitating ring cooling and furthermore eliminating the necessity of machining the grooves when installing new rings. Each upper channel 20 is so shaped as to divert the oil from the ring, whereas each channel 18 directs the oil back to the ring. Thus, the oil seals the ring against the bottom land and also maintains a constant contact between the ring and the piston, which, in turn, facilitates the cooling of the ring.

The top compression ring 13 is preferably pressure-sealed, the upper outer corner of said ring being provided with a vertically shallow, horizontally wide channel 22 which receives gases under pressure from the cylinder, causing downward pressure to firmly seat the ring 13 against the lower land 19. The channel 22 is vertically shallow to leave an adequately wide face on the ring for contact with the cylinder wall and to prevent the gas pressure from having any appreciable area against which to force toward the piston axis with danger of contracting and breaking the ring, and said channel is horizontally wide to subject an adequate horizontal area to gas pressure to oppose the inertia of the ring and to prevent it being thrown against the upper land. More briefly speaking, therefore, the channel 22 is for the purpose of admitting a sufficient amount of gas pressure to overcome the inertia of the ring and to prevent its being thrown against the upper land. While a loose-fitting conventional ring might perform in this way, up to a given engine speed, at extreme engine speeds the inertia of the ring would project it against the upper land before the gas pressure could take effect, and therefore, allow considerable flutter which would be extremely objectionable because it would not only cause the ring to rapidly wear, but would exaggerate blow-by of gases and flame. The ends of the channel 22 are closed by appropriate dams 23 to prevent the gases in said channel from reaching the gap 24 between the ends of the ring 13. In this connection, it may be remarked that all of the rings 13, 14 and 15 are of radially split form and of resilient nature, each ring being provided with one split such as 24. While resilient self-expanding rings are preferable, it is of course possible to make use of rings of the so-called tensionless type with spring devices behind them for pressing them against the cylinder wall.

The upper inner corner of the oil ring groove 11 is provided with a channel 25 into which the oil ring 15 upwardly throws oil at the end of each upward stroke of the piston, and the piston skirt 5 is formed with a plurality of oil passages 26 which conduct the upwardly thrown oil to the interior of the piston. These passages 26 incline upwardly and inwardly from the oil-receiving channel 25 and therefore, the oil thrown from the ring 15 into said channel 25, is thrown also through the passages 26, as the piston is suddenly stopped at upper dead center and starts on its down stroke. The upper inner corner of the oil ring 15 is provided with an acute angular edge 27 which breaks the adhesion of the oil to the ring and insures that the latter shall shed its oil into the channel 25 at the end of each upward piston stroke.

By providing the novel assemblage shown and described or an equivalent thereof, perfect oil control is attained. It is physically impossible for the oil to pass the bottom ring in any objectionable quantity but the essential film for ring lubrication is not impaired. The invention not only conserves oil but assures constant, consistent and thorough lubrication of the entire assembly, and this result is attained without over-oiling the upper cylinder. The invention is also of advantage if it should be desired to make use of a conventional cylinder wall lubricator for the purpose of supplying a different grade of oil for the rings and skirt, for instance, in the operation of unusually large engines, usually requiring a comparatively light oil to the piston skirt and a heavier oil to the rings. Moreover, the invention permits effective surface cooling by pump, pressure splash, or other systems of flooding the interior of the pistons with oil.

While the details disclosed are preferred, attention is again invited to the possibility of making variations within the scope of the invention as claimed.

I claim:

1. An oil controlling piston-and-ring-assembly comprising a skirted piston having a compression ring groove near its head, an oil ring groove spaced downwardly from said compression ring groove, and a gas pressure groove between said compression ring groove and said oil ring groove, compression and oil rings in said compression and oil ring grooves respectively, said oil ring groove having a channel in its inner upper corner into which said oil ring upwardly throws oil at the end of each upward stroke of the piston, the lower part of said oil ring groove being entirely closed against direct communication with the interior of the piston to receive no upwardly thrown oil therefrom, the piston skirt being provided with oil passages through which the upwardly thrown oil discharges from said channel, said oil passages extending upwardly and inwardly from said channel through said skirt.

2. An oil controlling piston-and-ring-assembly comprising a skirted piston having a compression ring groove near its head, an oil ring groove spaced downwardly from said compression ring groove, and a gas pressure groove between said compression ring groove and said oil ring groove, compression and oil rings in said compression and oil ring grooves respectively, said oil ring groove having a channel in its inner upper corner into which said oil ring upwardly throws oil at the end of each upward stroke of the piston, the piston skirt being provided with oil passages through which the upwardly thrown oil discharges from said channel, said oil passages extending upwardly and inwardly from said channel through said skirt, the upper inner corner of said oil ring being provided with an acute angular edge to break the adhesion of the oil to the ring.

3. An oil controlling piston-and-ring-assembly comprising a piston having a compression ring groove near its head, an oil ring groove spaced downwardly from said compression ring groove, and a gas pressure groove between said compression ring groove and said oil ring groove, a compression ring in said compression ring groove, and an oil ring in said oil ring groove, said gas pressure groove being unoccupied and therefore adapted to receive blow-by gas passing the compression ring, thereby preventing the partial vacuum above the piston during intake strokes from drawing oil past the piston into the cylinder, said compression ring having a vertically shallow horizontally wide channel formed in its upper outer corner to admit gas pressure to seat the ring against the lower land of the groove and prevent excessive gas pressure from reaching said gas pressure groove, the ends of said channel being closed, the entire lower side of said compression ring being disposed in a single horizontal plane.

4. An oil controlling piston-and-ring-assembly comprising a skirted piston having a compression ring groove near its head, an oil ring groove spaced downwardly from said compression ring groove, and a gas pressure groove between said compression ring groove and said oil ring groove, a compression ring in said compression ring groove, and an oil ring in said oil ring groove, said gas pressure groove being unoccupied and therefore adapted to receive blow-by gas passing the compression ring, thereby preventing the partial vacuum above the piston during intake strokes from drawing oil past the piston into the cylinder, said compression ring having a vertically shallow horizontally wide channel formed in its upper outer corner to admit gas pressure to seat the ring against the lower land of the groove and prevent excessive gas pressure from reaching said gas pressure groove, the ends of said channel being closed, said oil ring groove having an oil channel in its inner upper corner into which said oil ring upwardly throws oil at the upper end of each stroke of the piston, the piston skirt being provided with oil passages through which the upwardly thrown oil discharges from said oil channel, the upper inner corner of said oil ring being provided with an acute angular edge to break the adhesion of the oil to the ring, said oil passages extending upwardly and inwardly from said oil channel through the piston skirt.

5. In an oil controlling piston-and-ring-assembly, a piston having an oil ring groove, and an oil ring in said groove, the upper inner corner of said oil ring groove being provided with an oil channel into which said oil ring upwardly throws oil at the end of each upward stroke of the piston, the piston skirt being provided with oil passages through which the upwardly thrown oil discharges from said oil channel, the entire lower part of said ring groove being closed against direct communication with the interior of the piston to receive no upwardly thrown oil therefrom, said oil passages extending upwardly and inwardly from said oil channel through said skirt.

6. In an oil controlling piston-and-ring-assembly, a piston having an oil ring groove, and an oil ring in said groove, the upper inner corner of said oil ring groove being provided with an oil channel into which said oil ring upwardly throws oil at the end of each upward stroke of the piston, the piston skirt being provided with oil passages through which the upwardly thrown oil discharges from said oil channel, said oil passages extending upwardly and inwardly from said oil channel through said skirt, the upper inner corner of said oil ring being provided with an acute angular edge to break the adhesion of the oil to the ring.

7. A piston having a compression ring groove, and a compression ring in said groove, said compression ring having a vertically shallow horizontally wide channel formed in its upper outer corner to admit gas pressure to seat the ring against the lower land of the groove, the ends of said channel being closed, the lower side of said ring being flat and disposed in a single plane throughout its width.

8. In a device of the class described, a piston having an oil ring groove, the upper inner corner of said groove being provided with an oil channel into which the oil ring upwardly throws oil at the end of each upward stroke of the piston, the piston skirt being provided with oil passages through which the upwardly thrown oil discharges from said oil channel, the entire lower part of said groove being closed against direct communication with the interior of the piston to receive no upwardly thrown oil therefrom, said oil passages extending upwardly and inwardly from said oil channel through the piston skirt.

9. In a device of the class described, an oil ring of uniform height throughout its radial width, the upper inner corner of said oil ring being provided with an upwardly directed acute angular edge to break the adhesion of the oil to the ring when said ring stops its upward travel.

10. In a device of the class described, a skirted piston having a compression ring groove near its head, an oil ring groove spaced downwardly from said compression ring groove, and a gas pressure groove between said compression ring groove and said oil ring groove, said oil ring groove having a channel in its inner upper corner into which the oil is upwardly thrown at the end of each upward stroke of the piston, the lower part of said oil ring groove being entirely closed against direct communication with the interior of the piston to receive no upwardly thrown oil therefrom, the piston skirt being provided with oil passages through which the upwardly thrown oil discharges from said oil channel, said oil passages extending upwardly and inwardly from said channel through said skirt.

11. An oil-controlling piston-and-ring-assembly comprising a piston having a compression ring groove near its head, an oil ring groove spaced downwardly from said compression ring groove, and a gas pressure groove between said compression ring groove and said oil ring groove, a compression ring in said compression ring groove, and an oil ring in said oil groove, said gas pressure groove being unoccupied and therefore adapted to receive blow-by gases passing the compression ring, thereby preventing the partial vacuum above the piston during intake strokes from drawing oil past the piston into the cylinder and serving to trap unburned gases and liquid fuel descending from the cylinder, said gas pressure groove having a bottom wall and an inclined upper wall diverging upwardly and outwardly from said bottom wall to the piston periphery to allow upward throwing of any liquid from said gas pressure groove when the piston suddenly stops at upper dead center.

12. A piston having a compression ring groove near its head, an oil ring groove spaced downwardly from said compression ring groove, and a gas pressure groove between said compression ring groove and said oil ring groove, said gas pressure groove being adapted to receive blow-by gases from the cylinder, thereby preventing the partial vacuum above the piston during intake strokes from drawing oil past the piston into the cylinder and serving to trap unburned gases and liquid fuel descending from the cylinder, said gas pressure groove having a bottom wall and an inclined upper wall diverging upwardly and outwardly from said bottom wall to the piston periphery to allow upward throwing of any liquid from said gas pressure groove when the piston suddenly stops at upper dead center.

13. A piston having a ring groove and a ring seated in said groove, the upper inner corner of said groove being provided with a channel shaped to divert the oil from the ring, the lower inner corner of said groove being provided with another channel to direct the oil back toward the ring, during reciprocation of the piston.

PRESTON BROOKS BLOCKER.